(12) United States Patent
Rohling et al.

(10) Patent No.: US 6,686,871 B2
(45) Date of Patent: Feb. 3, 2004

(54) METHOD FOR HPRF-RADAR MEASUREMENT

(75) Inventors: Hermann Rohling, Wolfenbuettel (DE); Wilhelm Guener, Ulm (DE); Hans Hommel, Baindt (DE); Dieter Nagel, Erbach (DE)

(73) Assignee: EADS Deutschland GmbH, Ottobrunn (DE)

( * ) Notice: Subject to any disclaimer, the term of this patent is extended or adjusted under 35 U.S.C. 154(b) by 0 days.

(21) Appl. No.: 10/303,057

(22) Filed: Nov. 25, 2002

(65) Prior Publication Data

US 2003/0156057 A1 Aug. 21, 2003

(30) Foreign Application Priority Data

Nov. 24, 2001 (DE) .......................................... 01127990

(51) Int. Cl.⁷ .............................................. G01A 13/32
(52) U.S. Cl. ..................... 342/109; 342/81; 342/104; 342/127; 342/128; 342/129; 342/130
(58) Field of Search ......................... 342/81, 104, 109, 342/115, 118, 127–132, 195–196

(56) References Cited

U.S. PATENT DOCUMENTS

| | | | |
|---|---|---|---|
| 3,889,261 A | * 6/1975 | Sirven ......................... | 342/127 |
| 4,106,017 A | * 8/1978 | Roeder et al. ................. | 342/88 |
| 5,294,932 A | * 3/1994 | Nagel ......................... | 342/109 |
| 5,311,189 A | * 5/1994 | Nagel ......................... | 342/95 |
| 5,633,643 A | * 5/1997 | Erhage ........................ | 342/159 |
| 5,646,623 A | * 7/1997 | Walters et al. ............... | 342/129 |
| 6,232,912 B1 | * 5/2001 | Nagel .......................... | 342/137 |

* cited by examiner

*Primary Examiner*—Thomas H. Tarcza
*Assistant Examiner*—Isam Alsomiri
(74) *Attorney, Agent, or Firm*—Crowell & Moring LLP

(57) ABSTRACT

In a method for HPRF-radar measurement of the range and Doppler frequency of at least one target, a transmit signal is generated which consists of two pulse sequences that are interleaved on a pulse to pulse basis, and have the same pulse repetition frequency PRF and the same transmit frequency. The pulses of a first one of the two pulse sequences have a linearly increasing phase value with a fixed phase difference $\phi_{1n}$ (greater than zero) from pulse to pulse with $\phi_{1n} \geq 0$, while the pulses of the second pulse sequence have a linear increasing phase value with a fixed phase difference $\phi_{2n}$ which differs from $\phi_{1n}$. The two received base band signals of each individual pulse sequence are Fourier transformed, and the amplitude peaks of the resulting two Fourier spectra are determined. The amplitude peaks of the two Fourier spectra are then clustered to determine pairs of spectral lines of a Doppler frequency shift of $$\Delta f = \frac{\varphi_{2n} - \varphi_{1n}}{2\pi} \cdot PRF.$$

The target Doppler frequency is calculated based on two Doppler frequencies of a previously determined spectral line pair, and the target range is calculated based on the phase difference between the two spectral lines of a previously determined spectral line pair.

2 Claims, 3 Drawing Sheets

No. of Doppler bins

METHOD FOR HPRF-RADAR MEASUREMENT

BACKGROUND AND SUMMARY OF THE INVENTION

This application claims the priority of 011 27 990.8, filed Nov. 24, 2001, the disclosure of which is expressly incorporated by reference herein.

The invention relates to a method for High Pulse Repitition Frequency (HPRF) radar measurement of target range and Doppler frequency, such as may be used, for example, in an airborne radar system.

The use of a well known radar waveform with two slightly different transmit frequencies is often referred to in the literature as a frequency shift keying (FSK) technique. Using such a technique, target range and velocity can be measured unambiguously even in multi target situations. FIG. 1 shows the two carrier frequencies $f_1$ and $f_2$ as a function of time. Each frequency represented by a horizontal line corresponds to a coherent processing interval (CPI), and includes a pulse sequence of N-2048 pulses each.

In each CPI of length T, a received pulsed signal is directly down converted with the individual instantaneous transmit frequency, and shows as a single information the Doppler frequencies of the observed targets. The two base band signals are Fourier transformed, and target line left out will be observed in two adjacent CPI's in the same Doppler bin, but with different phase information. For a simultaneous range measurement, these two phases $\phi_1$, $\phi_2$ in the same Doppler bin are considered and the phase difference $\Delta\phi=\phi_2-\phi_1$ is calculated. The latter is directly related to the target range R in accordance with the following equation:

$$\Delta\phi = 2\pi \cdot \Delta f \cdot \frac{2R}{c} \quad \text{Eq. (1)}$$

The range measurement is unambiguous if $\Delta\phi<2\pi$. In order to measure target ranges up to $R_{max}=150$ km, the frequency shift in the FSK wave form must be:

$$\Delta f \leq \frac{c}{2R} = 1 \text{ kHz}.$$

The basic idea is applicable to the extent that the assumptions of a purely stationary observation are fulfilled. But each target maneuver inside the measurement time 2T will have a large influence on the phase measurement in the adjacent CPI's, and will cause large range errors in the range estimation procedure in accordance with Eq. 1.

One object of the present invention is to provide a method for simultaneously and unambiguously measuring target range and target Doppler frequency for highly mobile targets, even in multiple target situations.

This and other objects and advantages are achieved by the present invention, in which a transmit oscillator generates a single unmodulated frequency. The HPRF pulse sequence is split into two interleaved parts, which are distinguished and modulated with a digital phase shift keying (PSK) modulation scheme as follows:

The pulses of the first pulse sequence have the same phase state or alternatively have a linearly increasing phase value with a fixed phase difference $\phi_{1n}$ from pulse to pulse; and The pulses of the second pulse sequence have a linearly increasing phase value with a fixed phase difference $\phi_{2n}$ from pulse to pulse with $\phi_{1n} \neq \phi_{2n}$ and $\phi_{1n} > 0$.

The latter step is important because it renders the down conversion process simple. The PSK technique guarantees unambiguous range measurement and the interleaved pulse sequences make the measurement robust against target maneuver. Before this background all important requirements can be fulfilled with the PSK waveform according to the invention.

Other objects, advantages and novel features of the present invention will become apparent from the following detailed description of the invention when considered in conjunction with the accompanying drawings.

DETAILED DESCRIPTION OF THE DRAWINGS

Figure 1:
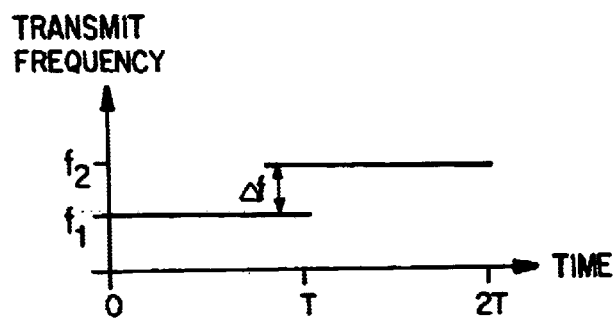
FIG. 1 is a graphic representation of the transmit frequency for FSK-radar as a function of time.
Figure 2A:
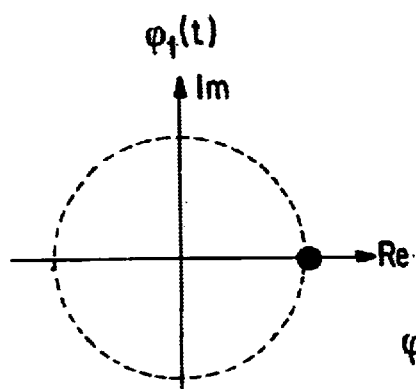
FIGS. 2.a and 2.b are constellation diagrams which show the phase steps from pulse to pulse for the transmit signal according to the invention.
Figure 2B:
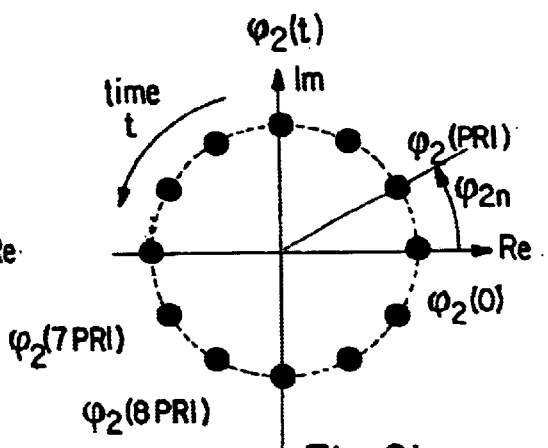

The digital PSK waveform can be described easily by the constellation diagram of the phase states of the different pulses in the pulse sequence. In a preferred embodiment a distinction is made between a fixed phase modulation of the first sequence, in which all pulses have the same phase state (for example zero phase) for each pulse, as shown in FIG. 2.a. In this case, the second pulse sequence will have a linearly increasing phase modulation with a fixed phase difference from pulse to pulse, as shown in FIG. 2.b.

Figure 3:
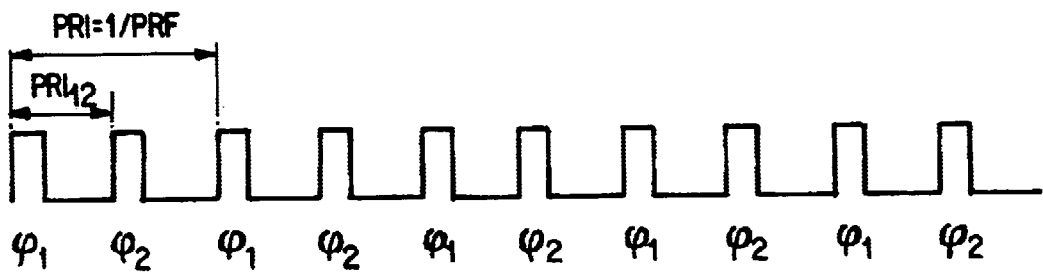
FIG. 3 shows the transmit waveform according to the invention, with the corresponding pulses to the phase steps of FIG. 2.

For this digital PSK waveform the transmit signal consists of two interleaved pulse sequences with a fixed transmit frequency, but one having a constant phase (first pulse sequence), and the other being modulated by a linear phase modulation technique (second pulse sequence), as shown in FIG. 3.

The phase modulation from pulse to pulse can be realized for example by using the quadrature modulation technique which is well known in digital radio transmission. The amplitude envelope of the waveform is constant, so that no distortion due to nonlinearity of the individual amplifier need be considered. The linear phase modulation of the second pulse sequence is carried so that the phase shift from pulse to pulse satisfies the condition that in the complete pulse sequence the phase rotates exactly (for example) 20 times in the constellation diagram. This condition leads to a shift in the Doppler frequency domain of exactly 20 FFT bins.

Figure 4:
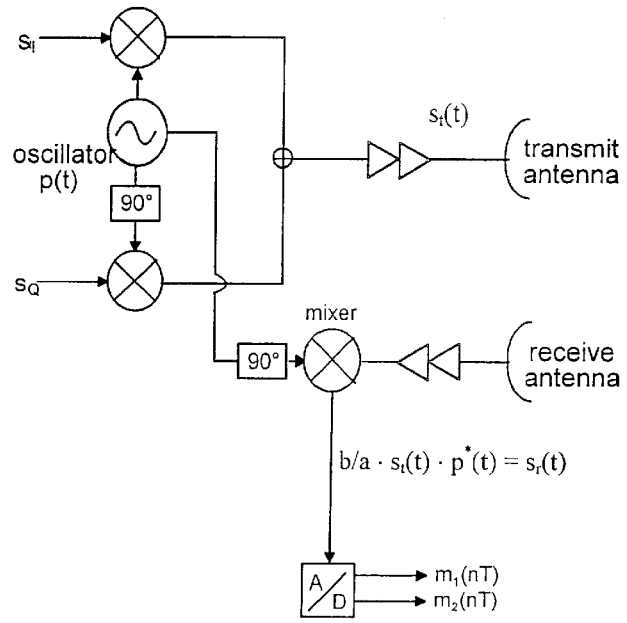
FIG. 4 is a schematic diagram of a radar transmit/receive system for carrying out the method according to the invention.

FIG. 4 shows the transmitter/receiver block diagram of the radar system on the basis of a quadrature (de)modulator.

The transmit signal $s_t(t)$ can be described analytically as follows, wherein p(t) is the modulator function and s(t) is the complex video signal:

$p(t)=e^{j2\pi f_0 t}$ $s(t)=s_I(t)+js_Q(t)=ae^{j\phi(t)}$ $s_t(t)=p(t)\cdot s(t)$ $s_t(t)=ae^{j(2\pi\cdot f_0\cdot t+\phi(t))}$, $f_0$ transmit frequency with $\phi(t)=\phi_1(t)=0$ for $2n\cdot PRI_{12}\leq t<(2n+1)\cdot PRI_{12}$, $n$ Pulse number Eq. (2)

$\phi(t)=\phi_2(t)=\text{int}(t/PRI-0.5)\cdot \phi_2 n$
for $(2n+1)\cdot PRI_{12}\leq t<(2n+2)\cdot PRI_{12}$     Eq. (3)

The received signal is down converted with the fixed instantaneous carrier frequency $f_0$ of the transmit oscillator signal p(t) that is also used as the demodulator signal. The demondulator signal is then the complex conjugate of p(t):

$$S_r(t) = \frac{b}{a}\cdot s_t(t)\cdot p^*(t) = be^{j(2\pi\cdot f_0\cdot t+\varphi(t))}\cdot e^{-j2\pi f_0 t}$$

$$= be^{j\varphi(t)}$$

$$= b\cos\varphi(t)+jb\sin\varphi(t)$$

wherein for (p(t) the above mentioned Eq's 2 and 3 still apply and b refers to the considerably lower amplitude of the receiving signal.

Figure 5:
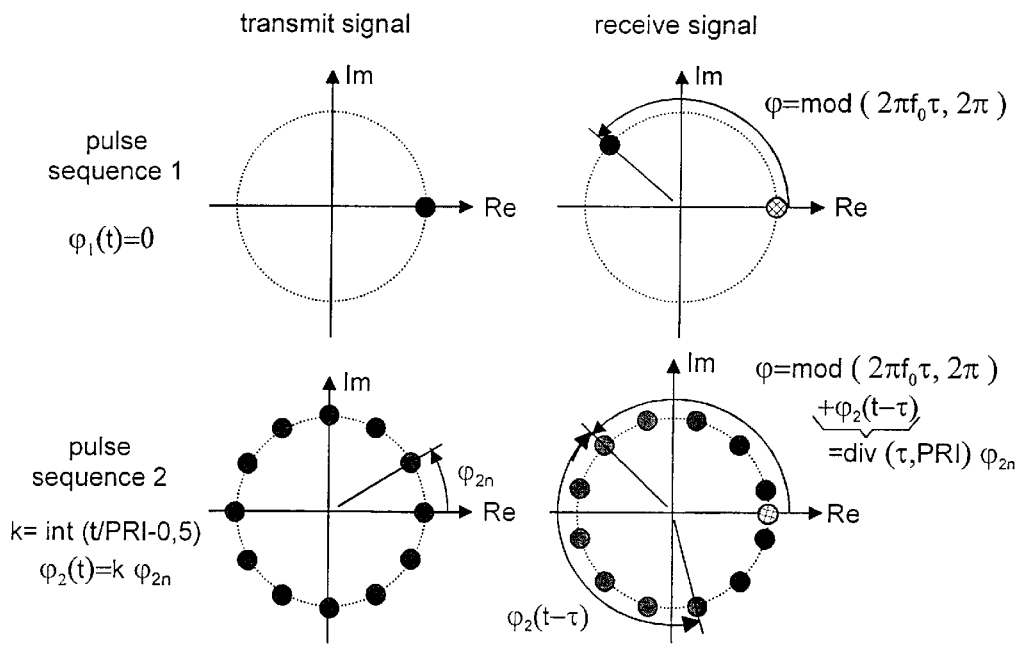
FIG. 5 is a constellation diagram of the transmit and receive signal (base band domain) according to the invention.

The advantage of the waveform according to the invention is that the phase constellation diagram of the receive signal is shifted compared with the transmit signal only due to the time delay τ or the target range R respectively, as shown in FIG. 5.

The demodulated signal is A/D converted as shown in FIG. 4, and the received base band signal is split into the two signal sequences $m_2$, $M_2$ (FIG. 4) corresponding to first and second transmit pulse sequence. The received base band signal $m_1$, $M_2$ of each individual pulse sequence is Fourier transformed, and each spectral line is represented by a complex value in amplitude and phase. The Doppler frequency shift is estimated after target detection. Due to the linear phase modulation in the second pulse sequence a single target will be observed after Fourier transformation with the same Doppler frequency but with an additional frequency shift of Δf (20 FFT bins in the considered example).

Figure 6:
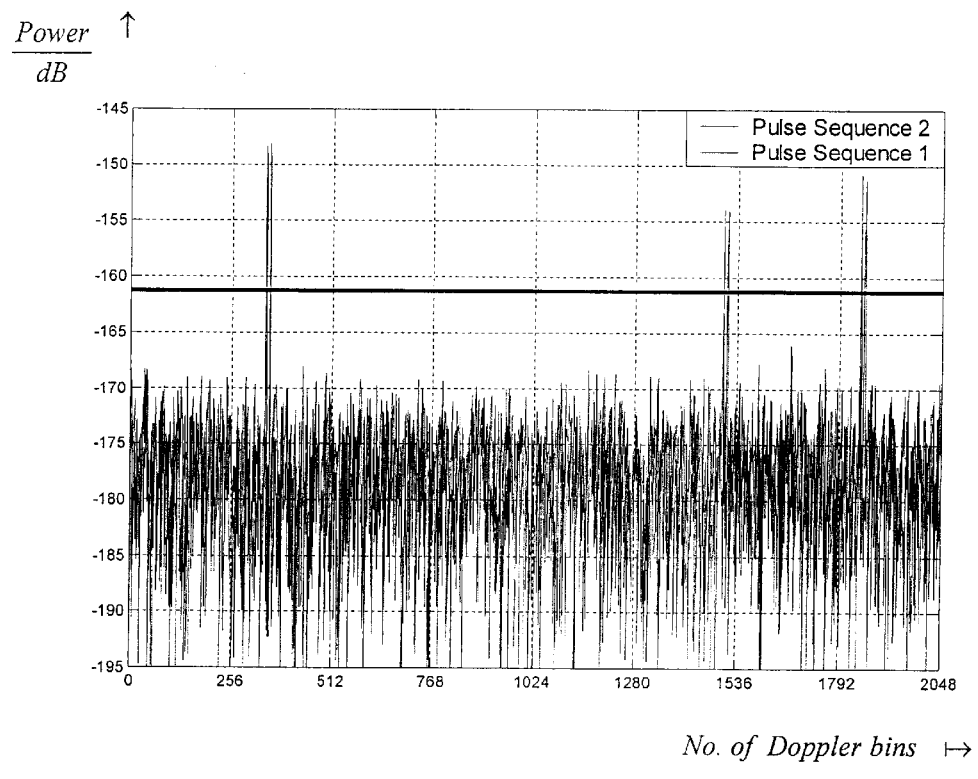
FIG. 6 shows frequency spectra of the received base band signals containing three targets.

An example representing a 3 target situation is shown in FIG. 6 which contains the frequency spectra of the received base band signals of first (dark gray) and second (light gray) pulse sequences. As can be easily seen from that drawing, for each target there exists a pair of spectral lines (one from the spectrum of the first pulse sequence and one from the spectrum of the second pulse sequence) with a certain frequency shift Δf.

In order to measure target range and speed simultaneously, the following signal processing steps are performed:

calculate Fourier transformation of both receive signals;
   search the maximum amplitude peaks in both spectra;
   cluster the maxima of both spectra which have a frequency shift of Δf (Doppler bin pair);
   calculate Doppler frequency (or target speed) for each Doppler bin pair; and
   calculate phase difference for each Doppler bin pair and calculate target range.

These steps will now be described in detail based on a preferred embodiment of the invention.

Figure 7:
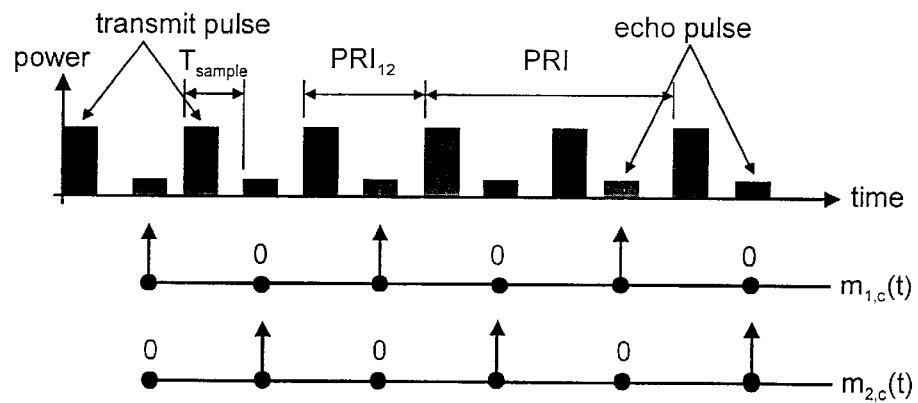
FIG. 7 illustrates a sampling scheme for signal processing of the received base band signal, wherein $m_{1,c}(t)$, $m_{2,c}(t)$ are the sampling sequences for demultiplexing.

Transmit signal $s_t(t)$ generation and the mixing process are well known and require no further explanation. The received demodulated signal $s_r(t)$ is sampled with $f_a=4$ MHz sampling frequency which leads to a range gate width RGW of 37.5 m. The total sampling process of the base band signal is depicted in FIG. 7.

The receive sampled sequence inside a single range gate is considered. The sample values have a time distance of $PRF_{12}$. This signal sequence is split into two different interleaved sequences filled with zeros as shown in FIG. 7. The described signal processing in FIG. 7 is for demultiplexing the two received interleaved pulse sequences $m_1(t)$ and $M_2(t)$, where it is not known if the sequence $m_1(t)$ contains the echo signal of the transmit sequence with constant phase states and $M_2(t)$ the echo signal of the transmit sequence with linear phase modulation or vice versa. Thus, it is necessary to distinguish the base band signal for each range gate into two cases described by Equations (4) and (5).

$$m_1(t) = \begin{cases} b\cdot\exp\left(j\cdot\left[2\pi\cdot f_{dop}\cdot t+\underbrace{\varphi_1(t-\tau)}_{=0}-2\pi\cdot f_0\cdot\tau\right]\right), \\ 2n+1\leq t\,|\,PRI_{12}<2n+1 \\ 0, \quad 2n+1\leq t\,|\,PRI_{12}<2n+2 \end{cases}$$ (Eq. 4)

$$m_2(t) = \begin{cases} b\cdot\exp\left(j\cdot\left[\underbrace{2\pi\cdot f_{dop}\cdot t+\varphi_2(t-\tau)}_{=2\pi(f_{dop}+\Delta f)t+div(\tau,PRI)}-2\pi\cdot f_0\cdot\tau\right]\right), \\ 2n+1\leq t/PRI_{12}<2n+2 \\ 0, \quad 2n<t/PRI_{12}<2n+1 \end{cases}$$

The amplitude b of the target echo signal is calculated in accordance with the radar cross section (RCS) and in accordance to the radar equation.

$$m_1(t) = \begin{cases} b\cdot\exp\left(j\cdot\left[\underbrace{2\pi\cdot f_{dop}\cdot t+\varphi_2(t-\tau)}_{=2\pi(f_{dop}+\Delta f)t+div(\tau,PRI)}-2\pi\cdot f_o\cdot\tau\right]\right), \\ 2n\cdot\leq t/PRI_{12}<2n+1 \\ 0, \quad 2n+1\cdot\leq t/PRI_{12}<2n+2 \end{cases}$$

$$m_2(t) = \begin{cases} b\cdot\exp\left(j\cdot\left[2\pi\cdot f_{dop}\cdot t+\underbrace{\varphi_1(t-\tau)}_{=0}-2\pi\cdot f_0\cdot\tau\right]\right), \\ 2n+1\cdot\leq t/PRI_{12}<2n+2 \\ 0, \quad 2n\leq t/PRI_{12}<2n+1 \end{cases}$$ Eq. (5)

Inside each individual range gate the two received and demultiplexed sequences $m_1(t)$ and $m_2(t)$ are first weighted using, for example, a Blackmann or a Hanning window, denoted as w(n) and Fourier transformed by an FFT. The resulting Doppler frequency spectra are denoted by $M_1(t)$ and $M_2(t)$.

$M_1$ (f, rangegate)=FFT($m_1(nT$, rangegate)·w(n))

$M_2$ (f, rangegate)=FFT ($m_2(nT$, rangegate)·w(n)).

For each range gate spectrum $M_1(f)$ a threshold is calculated, using a CA-CFAR algorithm (CA-CFAR: cell averaging-constant false alarm rate) such as disclosed in German patent document DE 196 00 779 A1, which is well known to those skilled in the art. The Doppler frequency of the k-th detected target is denoted by $f_{1,k}$ (number of FFT bin), the measured phase information on this FFT bin by $\phi_{1,k}$ and the range gate number by $rg_k$. This information is needed for further processing.

For all detected target amplitude peaks of $M_1(f)$ there are existing corresponding frequency peaks in the same range gates but in the spectrum $M_2(f)$. These frequencies are shifted due to the linear phase modulation by 20 FFT bins in the considered examples. The absolute frequency shift is given by:

$$\Delta f = \overline{\varphi_{2n} - \varphi_{1n}}^{=0} \cdot PRF$$

A binary factor $m_{pos}$ is introduced, which describes the two situations, in which $m_1(t)$ contains the echo signal of the constant phase modulation and $m_2(t)$ the echo signal of the linear phase modulation ($m_{pos}=1$) or vice versa ($m_{pos}=-1$).

Frequency peaks in both spectra $M_1(f)$ and $M_2(f)$ for the same range gate are correlated, if the detected frequency peaks are around 20 FFT bins apart. This situation can be described analytically by the following equation.

$$\frac{f_{2,k,rg} - f_{1,k,rg}}{\Delta f} = m_{pos,k} \in \{-1, 1\}$$

In the case of a frequency pair $f_{1,k,rg}$, $f_{2,k,rg}$ and the related phases $\phi_{1,k}$, $\phi_{2,k}$ target speed and range can be measured unambiguously and simultaneously even in multi target situations by the following simple equations.

The target Doppler frequency can be calculated by the measured frequencies based on the knowledge of which receive pulse sequences contains the zero phase stages ($m_{pos}=1$, or $m_{pos}=-1$)

$$f_{dop,k,rg} = \begin{cases} f_{1,k,rg} \mid m_{pos,k} = 1 \\ f_{2,k,rg} \mid m_{pos,k} = -1 \end{cases}$$

The radial velocity of the detected target is in this case:

$$v_{k,rg} = \frac{-f_{dop,k,rg}}{2} \cdot \frac{c}{f_0}$$

The target range R can now be calculated simply by the phase difference directly and the given range gate information:

$$\Delta\phi_k = \phi_{2,k} - \phi_{1,k}$$

The target range ambiguity factor $tr_{amb}$, which has a integer value, can be calculated by:

$$tr_{amb,k} = \text{int}\left(\frac{\Delta\phi_k}{\varphi_{2n} - \varphi_{1n}}\right) = \text{int}\left(\frac{\Delta\phi_k}{\varphi_{2n}}\right)$$

Using the target range ambiguity factor and the range gate information, the unambiguous target range is given by:

$$R_k = \begin{cases} (rg - 0.5) \cdot RGW + tr_{amb,k} \cdot R_{amb} \mid m_{pos,k} = 1 \\ (rg - 0.5) \cdot RGW + (tr_{amb,k} - 0.5) \cdot R_{amb} \mid m_{pos,k} = -1 \end{cases}$$

with rg being the number of range gate, where the target has been detected

RGW being the width of range gate $R_{amb}$ being the unabiguous range measurement interval given by PRI.

System Parameters

The table below shows typical system parameters for an airborne radar system in which the method according to the invention can be used.

| | | | |
|---|---|---|---|
| Carrier Frequency $f_t$ | 8.5 ... 10.7 GHz | FFT-Length | 2048 |
| Relative Velocity $v_{rel}$ | −1500 m/s ... +300 m/s | Unambiguous Range $R_{amb}$ | 1.5 km |
| Doppler Frequency Bandwidth | 90 kHz (−18 kHz ... 72 kHz) | Range Gate Width RGW | 37.5 m |
| Distance Measurement Range R | 0 km ... 150 km | Noise FIG. F | 5 |
| Antenna Gain G | 32 dB | Noise Bandwidth | 4 MHz |
| Sampling Frequency $f_a$ | 4 MHz | Noise Temperature | 293 K |
| Pulse Width $T_{PW}$ | 1/(4 MHz) = 250 ns | Transmit Power | 10 kW |
| Number of Pulses per Sequence (CPI) | 2048 | Target RCS | 5 m² |
| PRF | 100 kHz | $PRF_{12}$ | 200 kHz |

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for HPRF-radar measurement of range and Doppler frequency for at least one target, said method comprising:

generating a transmit signal which includes first and second pulse sequences that are interleaved on a pulse to pulse basis, and have the same pulse repetition frequency PRF and the same transmit frequency, wherein pulses of the first pulse sequence have a linearly increasing phase value, with a fixed phase difference $\phi_{1n}$ from pulse to pulse, with $\phi_{1n} \geq 0$;

pulses of the second pulse sequence have a linear increasing phase value with a fixed phase difference $\phi_{2n}$ from pulse to pulse, with $\phi_{1n} \neq \phi_{2n}$ and $\phi_{1n} \geq 0$;

Fourier transforming received base band signals of each individual pulse sequence;

determining amplitude peaks of resulting two Fourier spectra;

clustering the amplitude peaks of the two Fourier spectra to determine pairs of spectral lines of a Doppler frequency shift of $$\Delta f = \frac{\varphi_{2n} - \varphi_{1n}}{2\pi} \cdot PRF;$$

calculating target Doppler frequency based on the two Doppler frequencies of a previously determined spectral line pair; and calculating target range based on a phase difference between spectral lines of a previously determined spectral line pair.

2. An apparatus for HPRF-radar measurement of range and Doppler frequency for at least one target, comprising:

means for generating a transmit signal which includes first and second pulse sequences that are interleaved on a pulse to pulse basis, and have the same pulse repetition frequency PRF and the same transmit frequency, wherein pulses of the first pulse sequence have a linearly increasing phase value, with a fixed phase difference $\phi_{1n}$ from pulse to pulse with $\phi_{1n} \geqq 0$;

pulses of the second pulse sequence have a linear increasing phase value with a fixed phase difference $\phi_{2n}$ from pulse to pulse, with $\phi_{1n} \neq \phi_{2n}$ and $\phi_{1n} \geqq 0$;

means for Fourier transforming received base band signals of each individual pulse sequence;

means for determining amplitude peaks of resulting two Fourier spectra;

means for clustering the amplitude peaks of the two Fourier spectra to determine pairs of spectral lines of a Doppler frequency shift of $$\Delta f = \frac{\varphi_{2n} - \varphi_{1n}}{2\pi} \cdot PRF;$$

means for calculating target Doppler frequency based on the two Doppler frequencies of a previously determined spectral line pair; and means for calculating target range based on a phase difference between spectral lines of a previously determined spectral line pair.

* * * * *